M. C. BOYER.
Improvement in Sulky.

No. 124,785.               Patented March 19, 1872.

Witnesses,
Jno. B. Harding
Thos. McIlvain

M. C. Boyer
by his attr.
Howson and Son.

124,785

UNITED STATES PATENT OFFICE.

MICHAEL C. BOYER, OF NORRISTOWN, PENNSYLVANIA.

IMPROVEMENT IN SULKIES.

Specification forming part of Letters Patent No. 124,785, dated March 19, 1872.

Specification describing an Improved Racing-Sulky, invented by MICHAEL C. BOYER, of Norristown, county of Montgomery and State of Pennsylvania.

My invention consists of a racing sulky or buggy the frame of which so overhangs the wheels as to prevent the injuries which frequently arise from the wheels of one sulky becoming accidentally entangled with the wheels of another.

Figure 1:
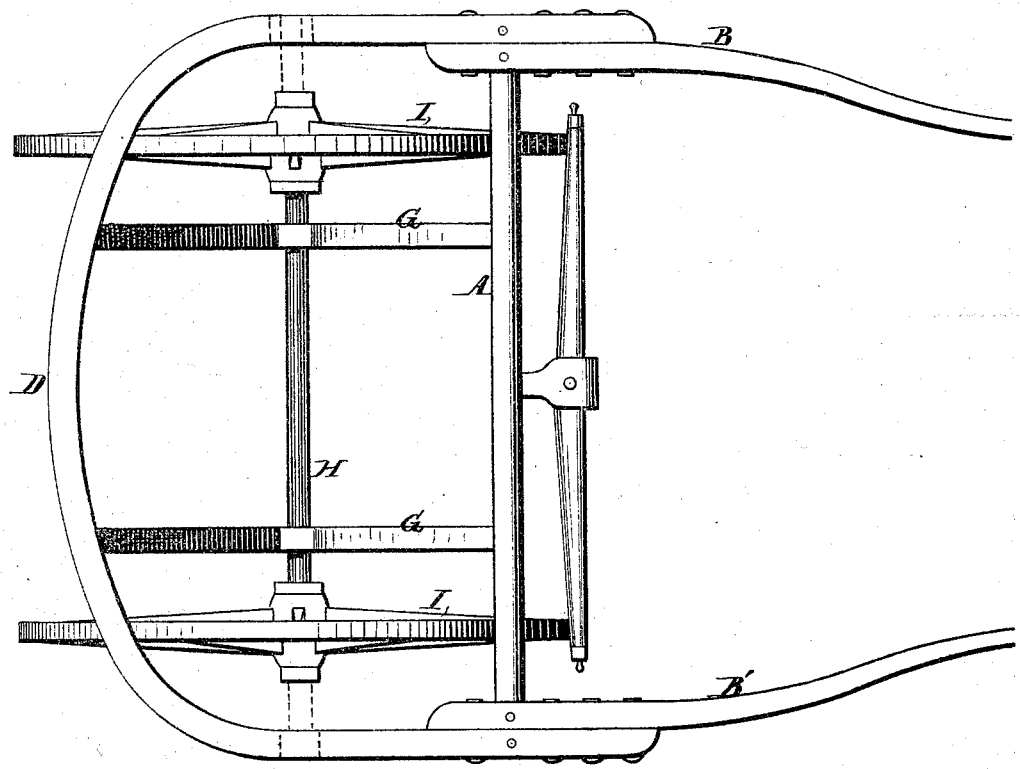
Figure 2:
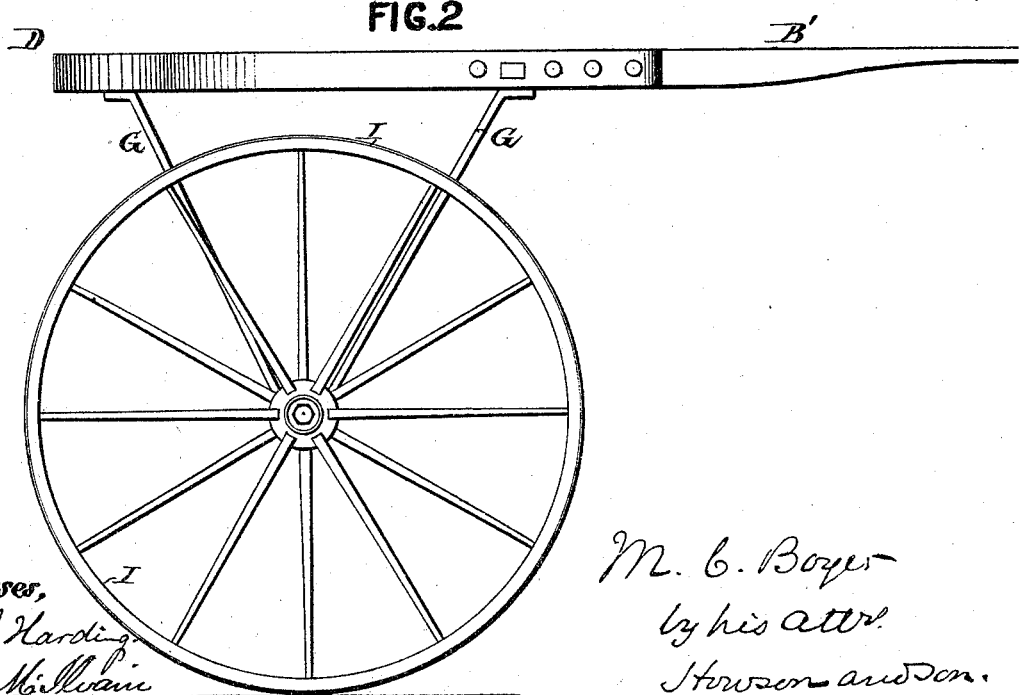

Figure 1 is a plan view of the frame and running-gear of my improved racing-sulky; and Fig. 2, a side view of the same.

Frequent accidents occur with the racing-sulkies of ordinary construction, owing to the wheels of one coming in contact with those of another. In order to prevent this, I so construct the frame of the vehicle that a portion shall overhang each wheel. In Fig. 1, for instance, the frame consists of a cross-bar, A, the shafts B and B', and the bent bar D. The bar A serves to connect the opposite shafts together, and to the shafts are secured the ends of the bent bar D in the manner clearly shown in the drawing. To the under side of the frame are secured the hangers G, carrying the axle H, on which the usual wheels I I revolve. The single-tree is connected to the bar A; or, if a pair of horses have to be hitched to the sulky, the ordinary pole is fitted to the same bar.

It is immaterial what springs, if any be required, are attached to the vehicle, and it is not necessary that the axle should be in one piece, as shown, as there may be two short axles, as indicated by dotted lines, suspended from the frame, one short axle for each wheel.

Although I prefer to make the rear of the frame of one bent bar, D, as shown, it may be made of more than one piece, providing, in all cases, that the frame overlaps the wheel and forms on each side of the vehicle a guard to prevent any injurious effects arising from the one vehicle coming in contact with the other.

I claim as my invention—

A sulky or other like vehicle the frame of which overhangs the wheels, substantially in the manner described.

In testimony whereof I have signed my name to this specification in the presence of two subscribing witnesses.

MICHAEL C. BOYER.

Witnesses:
  WM. A. STEEL,
  JOHN K. RUPERTUS.